United States Patent
King et al.

(10) Patent No.: US 10,040,894 B2
(45) Date of Patent: Aug. 7, 2018

(54) POLYMERIC MATERIALS FORMED FROM POLYHYDROXYALKANOATE MATERIALS

(71) Applicant: International Business Machines Corporation, Armonk, NY (US)

(72) Inventors: Scott B. King, Rochester, MN (US); Brandon M. Kobilka, Tucson, AZ (US); Joseph Kuczynski, North Port, FL (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/082,843

(22) Filed: Mar. 28, 2016

(65) Prior Publication Data

US 2017/0275412 A1    Sep. 28, 2017

(51) Int. Cl.

| | |
|---|---|
| C08G 18/77 | (2006.01) |
| C08J 9/00 | (2006.01) |
| C08G 18/32 | (2006.01) |
| C08G 63/91 | (2006.01) |
| G10K 11/162 | (2006.01) |
| C08G 18/70 | (2006.01) |
| C08G 18/81 | (2006.01) |
| C08L 69/00 | (2006.01) |

(52) U.S. Cl.
CPC ....... *C08G 18/771* (2013.01); *C08G 18/3206* (2013.01); *C08G 63/912* (2013.01); *C08J 9/0061* (2013.01); *G10K 11/162* (2013.01); *C08G 18/70* (2013.01); *C08G 18/81* (2013.01); *C08G 2350/00* (2013.01); *C08J 2375/04* (2013.01); *C08J 2375/06* (2013.01); *C08L 69/00* (2013.01)

(58) Field of Classification Search
CPC .......... C08G 18/70; C08G 18/81; C08L 69/00
See application file for complete search history.

(56) References Cited

U.S. PATENT DOCUMENTS

| | | | |
|---|---|---|---|
| 4,985,535 | A | 1/1991 | Takada et al. |
| 5,583,187 | A | 12/1996 | Sharak et al. |
| 5,753,765 | A | 5/1998 | Thomsen |
| 5,900,473 | A | 5/1999 | Acevedo et al. |
| 5,939,488 | A | 8/1999 | Nowicki et al. |
| 5,939,499 | A | 8/1999 | Anderson et al. |
| 5,952,405 | A | 9/1999 | Schoenberg et al. |
| 6,753,384 | B2 | 6/2004 | Whitehouse et al. |
| 7,094,840 | B2 | 8/2006 | Whitehouse et al. |
| 7,964,696 | B2 | 6/2011 | Gunatillake et al. |

(Continued)

FOREIGN PATENT DOCUMENTS

| | | |
|---|---|---|
| EP | 0455400 A2 | 11/1991 |
| EP | 2275468 A1 | 1/2011 |

OTHER PUBLICATIONS

"Curtius Rearrangement", Sep. 2010, Wiley & Sons, Inc., p. 780-783.*

(Continued)

*Primary Examiner* — Melissa A Rioja
(74) *Attorney, Agent, or Firm* — Patterson + Sheridan, LLP

(57) ABSTRACT

In an example, a process includes chemically reacting a polyhydroxyalkanoate (PHA) material having a carboxylic-acid terminated side-chain with an azide material to form a polyisocyanate material.

20 Claims, 2 Drawing Sheets

(56) References Cited

U.S. PATENT DOCUMENTS

Figure 1:
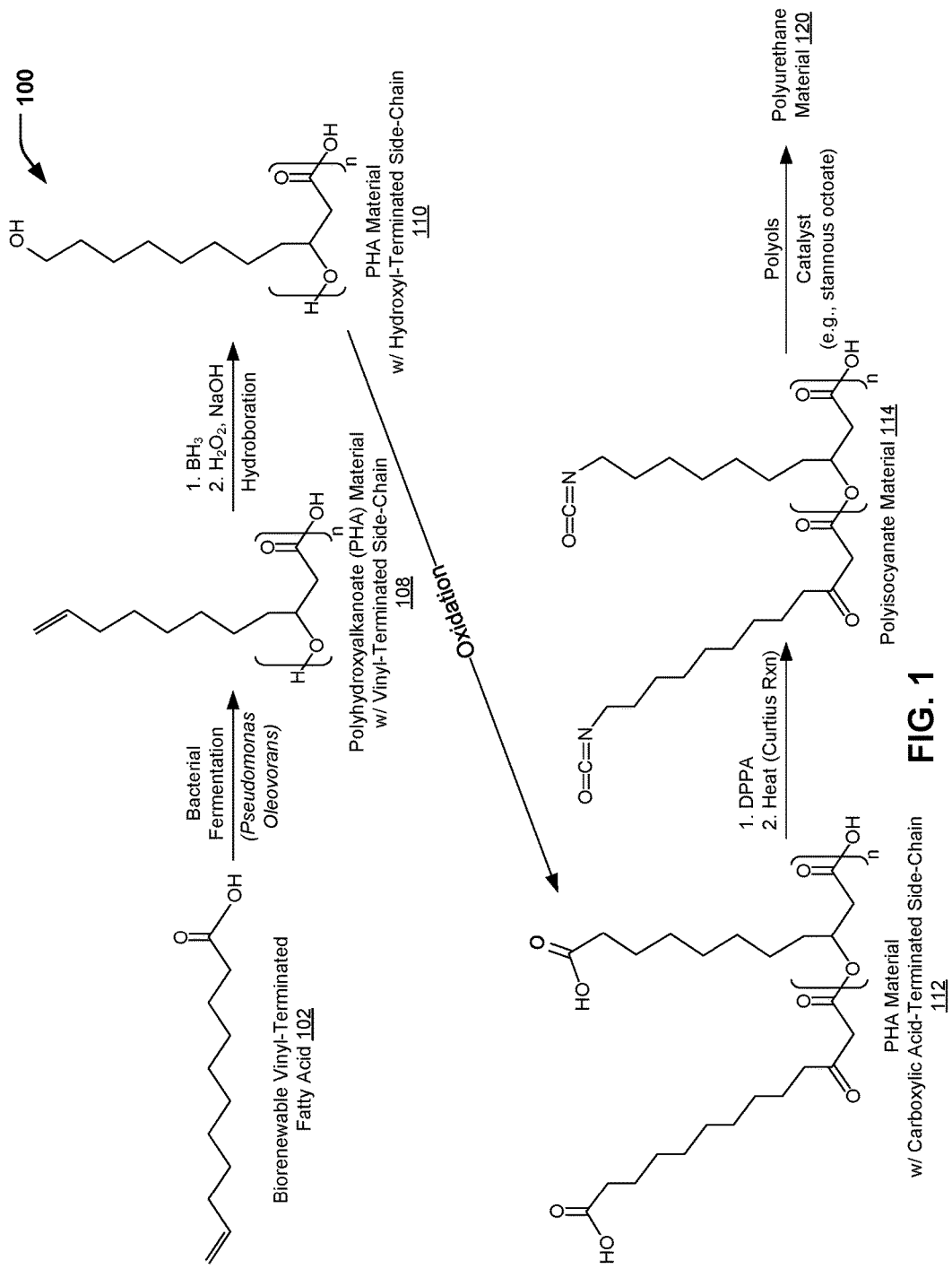

| | | |
|---|---|---|
| 7,968,641 B2 | 6/2011 | Killilea |
| 7,985,414 B2 * | 7/2011 | Knaack ............... A61K 31/785 424/422 |
| 8,076,381 B2 | 12/2011 | Miyagawa et al. |
| 8,519,038 B2 | 8/2013 | Burckhardt |
| 8,906,961 B2 | 12/2014 | Selifonov |
| 2002/0123625 A1 * | 9/2002 | Polovsky ............... A61K 8/608 536/120 |
| 2015/0197488 A1 | 7/2015 | Harrington et al. |

OTHER PUBLICATIONS

Sharmin et al., "Polyurethane: An Introduction", Aug. 2012, Intech, p. 3-16.*
Gomez, et al., "Making Green Polymers Even Greener: Towards Sustainable Production of Polyhydroxyalkanoates from Agroindustrial By-Products", Intech, Advances in Applied Biotechnology, Jan. 2012, 23 pp.
Biotechnology Forums, Bioplastics: Microbial Production of Polyhydroxyalkanoates (PHA's), viewed Feb. 10, 2016 http://www.biotechnologyforums.com/thread-2280.html, 6 pp.
Eroglu, et al., "Hydroxylation of Pendant Vinyl Groups of Poly(3-hydroxy undec-10-enoate) in High Yield", Journal of Applied Polymer Science, Vo. 97, Issue 5, Sep. 5, 2005, Wiley Online Library, pp. 2132-2139.
Akhlaghinia, et al., "A New and Convenient Method of Generating Alkyl Isocyanates from Alcohols, Thiols, and Trimethylsilyl Ethers Using a 2,4,6-Trichloro[1,3,5] Triazine/n-Bu4NOCN", Turkish Journal of Chemistry, vol. 31, 2007, pp. 35-43.

* cited by examiner

POLYMERIC MATERIALS FORMED FROM POLYHYDROXYALKANOATE MATERIALS

I. FIELD OF THE DISCLOSURE

The present disclosure relates generally to polymeric materials formed from polyhydroxyalkanoate (PHA) materials.

II. BACKGROUND

Plastics are typically derived from a finite and dwindling supply of petrochemicals, resulting in price fluctuations and supply chain instability. Replacing non-renewable petroleum-based polymers with polymers derived from renewable resources may be desirable. However, there may be limited alternatives to petroleum-based polymers in certain contexts. To illustrate, particular plastics performance standards may be specified by a standards body or by a regulatory agency. In some cases, alternatives to petroleum-based polymers may be limited as a result of challenges associated with satisfying particular plastics performance standards.

III. SUMMARY OF THE DISCLOSURE

According to an embodiment, a process includes chemically reacting a polyhydroxyalkanoate (PHA) material having a carboxylic-acid terminated side-chain with an azide material to form a polyisocyanate material.

According to another embodiment, a process of forming a polyurethane material is disclosed. The process includes chemically reacting a PHA material having a carboxylic-acid terminated side-chain with an azide material to form a polyisocyanate material. The process also includes chemically reacting the polyisocyanate material with a polyol to form a polyurethane material.

According to another embodiment, an acoustic dampening foam is disclosed. The acoustic dampening foam includes a petroleum-based polyurethane material and a biorenewable polyurethane material. The biorenewable polyurethane material is formed by a process that includes chemically reacting a PHA material having a carboxylic-acid terminated side-chain with an azide material to form a polyisocyanate material. The process also includes chemically reacting the polyisocyanate material with a polyol to form the biorenewable polyurethane material.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

IV. BRIEF DESCRIPTION OF THE DRAWINGS

Figure 2:
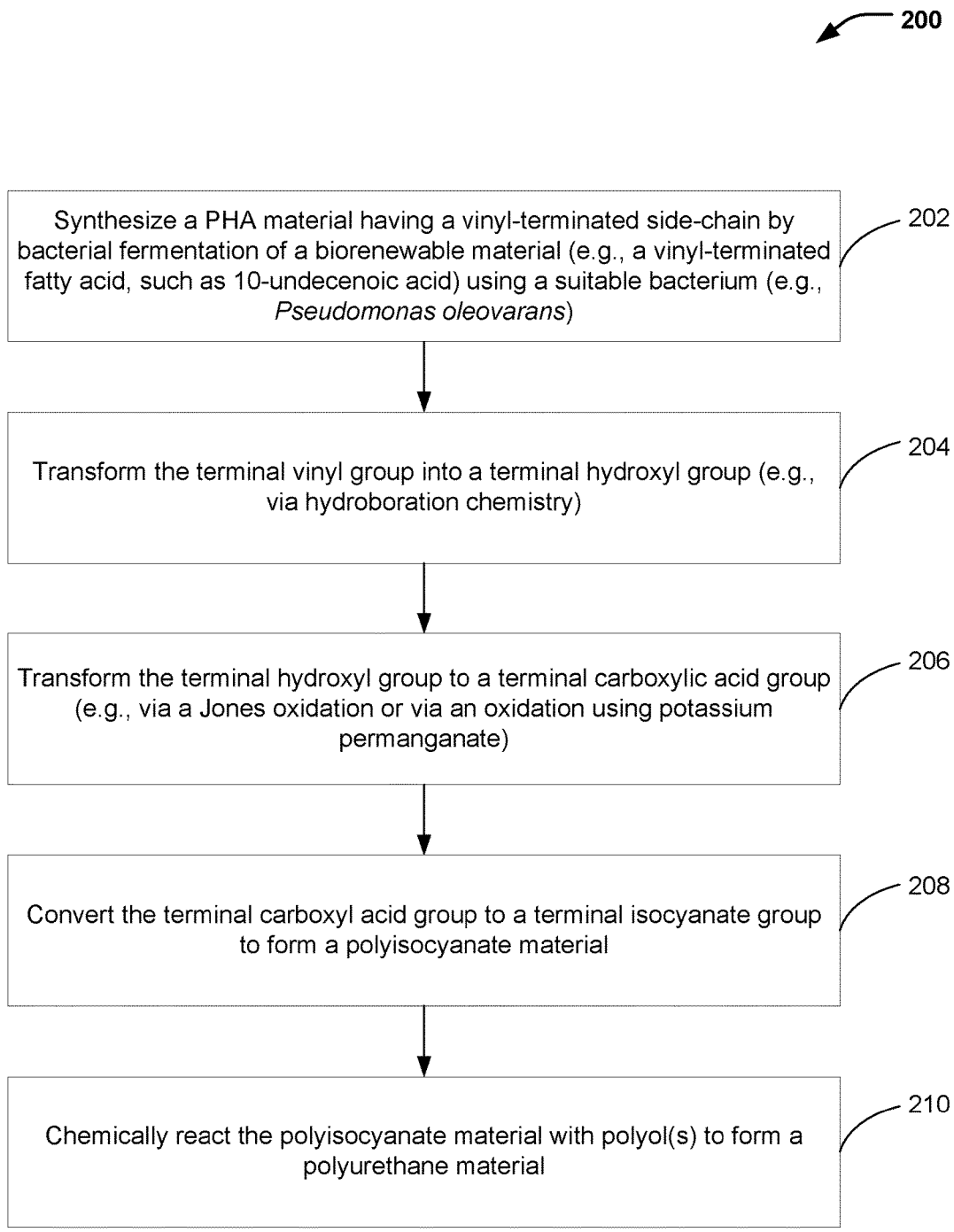

FIG. 1 is a chemical reaction diagram illustrating a process of forming polymeric material(s) from a PHA material, according to one embodiment; and FIG. 2 is a flow diagram showing a particular embodiment of a process of forming polymeric material(s) from a PHA material.

V. DETAILED DESCRIPTION

The present disclosure relates to polymeric materials formed from polyhydroxyalkanoate (PHA) materials and processes for forming such polymeric materials. In the present disclosure, PHA materials (which may be formed from biorenewable materials via a bacterial fermentation process) may be used to form polyisocyanate materials. The polyisocyanate materials of the present disclosure may be used to form polyurethane materials. As isocyanates are typically derived from petroleum, incorporation of isocyanate groups via side-chain functionalization of PHA materials, as described herein, may reduce dependence on non-renewable feedstocks. Further, in some cases, the polyisocyanate materials of the present disclosure may be chemically reacted with biorenewable polyols to further increase the biorenewability of the polyurethane materials.

As used herein, the term "PHA material" is used to refer to a poly(3-hydroxyalkanoate) material, which is a group of storage polymers produced by many types of bacteria in response to growth restriction by a nutrient other than the carbon source. To illustrate, *Pseudomonas oleovorans* is an example of a microorganism that produces PHAs with relatively long pendant side-chains. The long side-chains may contain some functionalities, such as olefins, that may provide sites for chemical modifications. In the present disclosure, a PHA material having a vinyl-terminated side-chain may be used to form a PHA material having a hydroxyl-terminated side-chain. The terminal hydroxyl group may be oxidized to a carboxylic acid group (e.g., via a Jones oxidation or via an oxidation using potassium permanganate, etc.), and the terminal carboxylic acid group may be converted to a terminal isocyanate group (e.g., via an acid-azide intermediate and subsequent Curtius rearrangement).

Referring to FIG. 1, a chemical reaction diagram 100 illustrates an example of a process of forming polymeric material(s) from a PHA material. In FIG. 1, a polyisocyanate material may be formed from the PHA material, and a polyurethane material may be formed from the polyisocyanate material. The first chemical reaction in FIG. 1 illustrates the formation of a PHA material 108 having a vinyl-terminated side-chain from a vinyl-terminated fatty acid 102 via a bacterial fermentation process. While a single biorenewable vinyl-terminated fatty acid (e.g., 10-undecenoic acid) is illustrated in the example of FIG. 1, alternative and/or additional vinyl-terminated fatty acid(s) may be used in other cases. FIG. 1 further illustrates that a vinyl group of the vinyl-terminated side-chain of the PHA material 108 may be converted to a hydroxyl group to form a PHA material having a hydroxyl-terminated side-chain 110. The hydroxyl group is subsequently oxidized to form a carboxylic acid group (e.g., via a Jones oxidization). The carboxylic acid group may be converted into an isocyanate with an azide reagent and subsequent heating step. The polyisocyanates can then be used to synthesize polyurethanes by a reaction with polyols.

In the particular embodiment illustrated in FIG. 1, the biorenewable vinyl-terminated fatty acid 102 includes 10-undecenoic acid. In some cases, the biorenewable vinyl-terminated fatty acid 102 (or multiple biorenewable vinyl-terminated fatty acids) may be formed from one or more biorenewable plant oils (e.g., castor oil in the case of 10-undecenoic acid). Other examples of biorenewable plant oils include vegetable oils, soybean oil, linseed oil, etc. Thus, while FIG. 1 illustrates one example of a single vinyl-terminated fatty acid, alternative and/or additional biorenewable vinyl-terminated fatty acid(s) of varying chain length may be used.

A bacterial fermentation process may be used to form the PHA material 108 having the vinyl-terminated side-chain. In the example of FIG. 1, *pseudomonas oleovorans* is illustrated as a bacterium that may be used for the bacterial fermentation process. Other suitable bacteria may be utilized in other cases. To illustrate, *pseudomonas oleovorans* may be grown in the presence of the biorenewable vinyl-terminated fatty acid 102 (e.g., 10-undecenoic acid in the example of FIG. 1), and the resulting polymer may be extracted from lyophilized cells using chloroform and precipitated with methanol.

The second chemical reaction depicted in FIG. 1 illustrates an example in which a terminal vinyl group of the PHA material 108 may be converted to a terminal hydroxyl group to form the PHA material 110 with the hydroxyl-terminated side-chain. In a particular embodiment (depicted as steps 1 and 2 in FIG. 1), the terminal vinyl group of the PHA material 108 may be converted to a terminal hydroxyl group via hydroboration chemistry. For example, hydroxylation of the PHA material 108 may be performed using borane or 9-borobicyclononane (9-BBN), which attaches only to the vinyl ends.

Prophetic Example: Hydroboration of Vinyl-Terminated Side-Chain

To a dried reaction vessel charged with "PHA," under an inert atmosphere (argon/nitrogen), a mixture of anhydrous chloroform/THF (e.g., a ratio of about 1:6 to give a PHA concentration of about 0.1 M, but this ratio could be flexible) may be added. The reaction may be cooled to about 0° C., and a solution of borane (or other applicable reagent such as 9-BBN, or disiamylborane≥1 equivalents per vinyl group) in THF may be added, dropwise. The reaction mixture may be warmed to room temperature and stirred for about 12 hours at room temperature. The reaction mixture may then be cooled to about 10° C., and a solution of NaOH may be added (3.0 M, in excess), followed by an addition of hydrogen peroxide (30 wt. %, in excess). The reaction mixture may be cooled to about −25° C., and a small amount of methanol (approx. 3% by volume) may be added, and the reaction may be stirred for a minimum of 10 minutes. A solution of 3M NaOH, approx. 5% by volume (approx. 1.3 equivalents), may then be added to the reaction mixture and may be stirred for about 15 minutes. A solution of hydrogen peroxide may then be added (approx. 30 wt. % in water, 3.5-4.0 equivalents). The reaction may be stirred at about −25° C. for about 1 hour, followed by a slow warming to about 40° C. over a time period of about 1 hour, followed by cooling to room temperature. The resulting solution may be filtered, and 1M HCl may be added dropwise until the reaction mixture reaches a neutral pH. The solvents may be removed in vacuo until a small amount remains, and the crude reaction mixture may be extracted with DMF, filtered, and the solvent removed in vacuo.

The third chemical reaction depicted in FIG. 1 illustrates that the terminal hydroxyl group of the PHA material 110 may be oxidized to a carboxylic acid (e.g., via a Jones oxidation) to form a PHA material 112 with a carboxylic acid-terminated side-chain.

Prophetic Example: Formation of PHA Material with Carboxylic Acid-Terminated Side-Chain As a prophetic example, a solution of potassium permanganate in an organic solvent (e.g., dichloromethane, chloroform, THF, dimethylformamide (DMF), dioxane, etc.) may be added dropwise to a solution of hydroxyl-functionalized PHA in the same organic solvent. This reaction mixture may then be heated to reflux and may be stirred for 24 hours. The reaction mixture may be filtered, and the polymer may be precipitated by pouring the solution into a miscible solvent that is non-polar solvent for the polymer. The polymer may be filtered and purified by methods known to those skilled in the art such as reprecipitation and Soxhlet extraction. Other oxidizing agents may be used to accomplish this transformation such as the Jones reagent, pyridinium dichromate in DMF, or (2,2,6,6-tetramethylpiperidin-1-yl)oxidanyl (TEMPO).

The fourth chemical reaction depicted in FIG. 1 illustrates that the carboxylic acid group may be converted into an isocyanate group. To illustrate, the carboxylic acid group may be converted to an acid azide group using a reagent such as diphenylphosphoryl azide (DPPA). The chemical reaction of the carboxylic acid groups of the PHA material 112 with an azide material converts the carboxylic acid groups to isocyanate groups, resulting in the formation of a polyisocyanate material 114. While not shown in FIG. 1, chemically reacting the carboxylic acid groups with the azide material may result in formation of acid azide molecules as an intermediate material. The acid azide molecules may be sufficiently heated to undergo a Curtius rearrangement to form the polyisocyanate material 114 illustrated in FIG. 1.

Prophetic Example: Preparation of Polyisocyanate Material

As a prophetic example, diphenylphosphoryl azide and triethylamine (both as 1 molar equivalent for each equivalent carboxylic acid) may be added to a stirred solution of a PHA material (with carboxylic-acid terminated side-chains) dissolved in dichloromethane (alternative solvents may be used such as chloroform, THF, toluene, etc.). The reaction mixture may be heated to reflux for about 2 hours, cooled to room temperature, and rinsed with water (e.g., three times) and brine (e.g., one time), dried over magnesium sulfate, and the solvents may be removed in vacuo. The product may then be purified. For the Curtius rearrangement, as a first example, the acyl azide mixture may be placed in a nitrogen atmosphere and heated to about 100° C. until reaction completion. After cooling of the reaction mixture to room temperature, the product may be purified. As an alternative example, the acyl azide mixture may be dissolved in toluene (0.2M solution) and heated at about 65° C. for about 1-4 hours or until the reaction is complete. The solvent may be removed in vacuo, and the product may be dried under vacuum.

The fifth chemical reaction depicted in FIG. 1 illustrates that the polyisocyanate 114 is then reacted with a polyol (or multiple polyols) to form a polyurethane material 120. In some cases, the polyol(s) can also be derived from biorenewable starting materials to further increase the biorenewable content of the polyurethane material 120.

Prophetic Example: Formation of Polyurethane Material

As a prophetic example, PHA-polyisocyanate, may be mixed with a polyol material in a reaction vessel. Polyols may include polyether polyols, polyester polyols, dipropylene glycol, glycerine, sorbitol, sucrose, bisphenol A, poly (tetramethylene ether) glycols, polyols synthesized from PHA, and polyols derived from plant oils. The polyisocyanate may be used in equimolar or excessive amounts relative to the polyol. The polyol may be used in excessive amounts relative to the polyisocyanate. A catalyst may be added to the reaction and may include triethylenediamine (TEDA), 1,4-diazabicyclo[2.2.2]octane or (DABCO), dimethylcyclohexylamine (DMCHA), dimethylethanolamine (DMEA), or metallic-based compounds of mercury, lead, tin, bismuth, and zinc. A surfactant may be added to the reaction mixture to modify the foaming properties and may include classes of polydimethylsiloxane-polyoxyalkylene block copolymers, silicone oils, nonylphenol ethoxylates. A small amount of water may also be added to facilitate foaming. The two compounds and any reagents or additives may be reacted in organic solvents such as THF, DCM, toluene, etc., and the reaction may be carried out at temperatures above or below room temperature. The reaction may be carried out in an inert atmosphere and may use anhydrous solvents. The product may be isolated by removal of the solvents, precipitation, recrystallization, Soxhlet extraction or by other techniques.

The mechanical properties of the polymeric materials of FIG. 1 (including the polyisocyanate material 114 and the polyurethane material 120) can be tuned by varying the chain length of the aliphatic acid(s) used in forming the PHAs and/or by varying the length of the PHAs themselves, which can be achieved by modifying the reaction conditions, such as time, temperature, and the bacteria selected for fermentation. The mechanical properties of the polyurethane material 120 can also be varied depending upon the polyol (s) selected, ratios, reaction conditions, etc.

In a particular embodiment, the polyurethane material 120 formed according to the process illustrated in FIG. 1 may be used as a component of an acoustic dampening foam (e.g., for mainframe servers). For example, an acoustic dampening foam may include a petroleum-based polyurethane material and a biorenewable polyurethane material. A weight percentage of the biorenewable polyurethane material may be not less than 10 weight percent of the acoustic dampening foam. Thus, in some cases, the biorenewable polyurethane materials of the present disclosure may allow for a reduction in an amount of petroleum-based polyurethane materials while satisfying particular mechanical property standards. The weight percentage may be adjusted based on desired material properties for the acoustic dampening foam. Illustrative, non-limiting examples of desired material properties may include a density of about 2 pounds per cubic foot, a pore count of about 65-75 pores per inch, and a biological content of at least 10 weight percent. In the context of fabric-over-foam gaskets, a desired material property may be a compression set of less than 5 percent following compression to 50 percent of an initial thickness.

Thus, FIG. 1 illustrates an example of a process of forming polymeric materials, including polyisocyanate materials and polyurethane materials, from a PHA material. The PHA material that is used to form the polyisocyanate materials may be derived from biorenewable materials (e.g., from a biorenewable vinyl-terminated fatty acid via a bacterial fermentation process). Further, in some cases, the polyol(s) that are chemically reacted with the polyisocyanate materials to form the polyurethane materials may be biorenewable, further increasing the biorenewable content.

Referring to FIG. 2, a flow diagram illustrates a process 200 of forming polymeric material(s) from a PHA material, according to a particular embodiment. In FIG. 2, a PHA material having a vinyl-terminated side-chain may be used to form a PHA material having a hydroxyl-terminated side-chain. The terminal hydroxyl group may be oxidized to a carboxylic acid group (e.g., via a Jones oxidation), and the terminal carboxylic acid group may be converted to a terminal isocyanate group (e.g., via an acid-azide intermediate and subsequent Curtius rearrangement) to form a polyisocyanate material. In the particular embodiment illustrated in FIG. 2, the process 200 also includes forming a polyurethane material from the polyisocyanate material (e.g., via a chemical reaction with a polyol, such as a biorenewable polyol).

In the particular embodiment illustrated in FIG. 2, operations associated with an example process of forming a PHA material having a carboxylic-acid terminated side-chain are identified as operations 202-206, while operations associated with the formation of polymeric material(s) from the PHA material are identified as operations 208-210. It will be appreciated that the operations shown in FIG. 2 are for illustrative purposes only and that the chemical reactions may be performed in alternative orders, at alternative times, by a single entity or by multiple entities, or a combination thereof. As an example, one entity may produce biorenewable vinyl-terminated fatty acid(s), another entity may produce PHA material(s) with vinyl-terminated side-chain(s), while another entity may produce PHA material(s) with carboxylic-acid terminated side-chain(s). Further, alternative or additional entities may perform operations associated with forming polyisocyanate material(s) from the PHA material(s) and/or operations associated with forming polyurethane material(s) from the polyisocyanate material(s).

In the particular embodiment illustrated in FIG. 2, the process 200 includes synthesizing a PHA material having a vinyl-terminated side-chain by bacterial fermentation of a biorenewable material using a suitable bacterium, at 202. For example, referring to FIG. 1, a bacterial fermentation process (e.g., using *pseudomonas oleovarans* bacteria) of a biorenewable vinyl-terminated fatty acid 102 (e.g., 10-undecenoic acid) results in the formation of the PHA material 108 having the vinyl-terminated side-chain.

The process 200 may include transforming the terminal vinyl group into a terminal hydroxyl group, at 204. For example, referring to FIG. 1, hydroboration chemistry may be used to convert a terminal vinyl group of the PHA material 108 to a terminal hydroxyl group, resulting in the formation of the PHA material 110 with the hydroxyl-terminated side-chain.

The process 200 may include transforming the terminal hydroxyl group to a terminal carboxylic acid group, at 206. For example, referring to FIG. 1, the terminal hydroxyl group of the PHA material 110 may be oxidized to a carboxylic acid group (e.g., via a Jones oxidation), resulting in the formation of the PHA material 112 with the carboxylic acid-terminated side-chain.

The process 200 includes converting the terminal carboxylic acid group to a terminal isocyanate group to form a polyisocyanate material, at 208. The conversion may include a chemical reaction with an azide and subsequent heat in order to promote complete conversion via a Curtius rearrangement. For example, referring to FIG. 1, the carboxylic acid-terminated side-chains of the PHA material 112 may be chemically reacted with an azide material (e.g., diphenylphosphoryl azide). While not shown in FIG. 1, chemically reacting the carboxylic acid-terminated side-chains of the PHA material 112 with the azide material may result in formation of acid azide molecules as an intermediate material. The acid azide molecules may undergo a Curtius rearrangement (e.g., via application of heat) to form the polyisocyanate material 114 illustrated in FIG. 1.

In the particular embodiment illustrated in FIG. 2, the process 200 also includes chemically reacting the polyisocyanate material with a polyol (or a mixture of polyols) to form a polyurethane material, at 210. For example, referring to FIG. 1, the polyisocyanate material 114 may be chemically reacted with one or more polyols to form the polyurethane material 120. In some cases, the polyol(s) may include biorenewable polyol(s), such as ethylene glycol, propylene glycol, butylene glycol and/or pentylene glycol, to further increase the biorenewable content of the polyurethane material 120.

Thus, FIG. 2 illustrates an example of a process of forming polymeric material(s) from a PHA material. In the example of FIG. 2, a PHA material having a vinyl-terminated side-chain is used to form a PHA material having a hydroxyl-terminated side-chain, and the terminal hydroxyl group may be oxidized to a carboxylic acid group. The terminal carboxylic acid group of the PHA material is converted to a terminal isocyanate group to form a polyisocyanate material. As isocyanates are typically derived from petroleum, incorporation of the isocyanate groups into the PHA material may reduce dependence on non-renewable feedstocks. FIG. 2 further illustrates the polyisocyanate material may be used to form a polyurethane material (e.g., via a chemical reaction with a polyol, such as a biorenewable polyol). In cases where the polyol(s) include biorenewable polyol(s), the biorenewable content of the resulting polyurethane material may be further increased.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A process comprising chemically reacting a polyhydroxyalkanoate (PHA) material having carboxylic-acid terminated side-chains with an azide material to form a polyisocyanate material.

2. The process of claim 1, further comprising forming the PHA material having the carboxylic-acid terminated side-chains from a PHA material having hydroxyl-terminated side-chains.

3. The process of claim 2, further comprising:
forming a PHA material having vinyl-terminated side-chains from a vinyl-terminated fatty acid via a bacterial fermentation process; and
converting a vinyl group of a plurality of the vinyl-terminated side-chains to a hydroxyl group to form the PHA material having the hydroxyl-terminated side-chains.

4. The process of claim 3, wherein the vinyl-terminated fatty acid includes a biorenewable vinyl-terminated fatty acid.

5. The process of claim 4, wherein the biorenewable vinyl-terminated fatty acid is formed from a biorenewable plant oil.

6. The process of claim 5, wherein the biorenewable plant oil includes castor oil, linseed oil, soybean oil, or a combination thereof.

7. The process of claim 4, wherein the biorenewable vinyl-terminated fatty acid includes 10-undecenoic acid.

8. The process of claim 1, further comprising chemically reacting the polyisocyanate material with a polyol to form a polyurethane material.

9. The process of claim 8, wherein the polyol includes a biorenewable polyol.

10. The process of claim 9, wherein the polyol further includes ethylene glycol, propylene glycol, butylene glycol, pentylene glycol, or a combination thereof.

11. The process of claim 1, wherein chemically reacting the PHA material with the azide material includes forming acid azide molecules as an intermediate material, and wherein the acid azide molecules undergo a Curtius rearrangement to form the polyisocyanate material.

12. The process of 1, wherein the azide material includes diphenylphosphoryl azide.

13. A process of forming a polyurethane material, the process comprising:
chemically reacting a polyhydroxyalkanoate (PHA) material having carboxylic-acid terminated side-chains with an azide material to form a polyisocyanate material; and
chemically reacting the polyisocyanate material with a polyol to form a polyurethane material.

14. The process of claim 13, further comprising forming the PHA material having the carboxylic-acid terminated side-chains from a PHA material having hydroxyl-terminated side-chains.

15. The process of claim 14, further comprising:
forming a PHA material having vinyl-terminated side-chains from a biorenewable vinyl-terminated fatty acid via a bacterial fermentation process; and
converting a vinyl group of a plurality of the vinyl-terminated side-chains to a hydroxyl group to form the PHA material having the hydroxyl-terminated side-chains.

16. The process of claim 15, wherein the biorenewable vinyl-terminated fatty acid includes 10-undecenoic acid.

17. The process of claim 13, wherein the polyol includes a biorenewable polyol.

18. The process of claim 17, wherein the polyol further includes ethylene glycol, propylene glycol, butylene glycol, pentylene glycol, or a combination thereof.

19. An acoustic dampening foam comprising:
a petroleum-based polyurethane material; and
a biorenewable polyurethane material formed by a process that includes:
chemically reacting a polyhydroxyalkanoate (PHA) material having carboxylic-acid terminated side-chains with an azide material to form a polyisocyanate material; and
chemically reacting the polyisocyanate material with a polyol to form the biorenewable polyurethane material.

20. The acoustic dampening foam of claim 19, wherein the biorenewable polyurethane material is not less than 10 weight percent of the acoustic dampening foam.

* * * * *